United States Patent [19]
Kobayashi et al.

[11] Patent Number: 5,196,936
[45] Date of Patent: Mar. 23, 1993

[54] GHOST CANCELLING RECEIVER USING GHOST CANCEL REFERENCE SIGNAL

[75] Inventors: Satoshi Kobayashi, Tokyo; Junya Saito, Saitama; Tsutomu Kume, Ibaraki; Takatomo Nagamine, Tokyo, all of Japan

[73] Assignee: Sony Corporation, Tokyo, Japan

[21] Appl. No.: 722,531

[22] Filed: Jun. 27, 1991

[30] Foreign Application Priority Data

Jul. 3, 1990 [JP] Japan .................................. 2-176071

[51] Int. Cl.⁵ .............................................. H04N 5/21
[52] U.S. Cl. ..................................... 358/167; 358/905
[58] Field of Search .................................. 358/167, 905

[56] References Cited

U.S. PATENT DOCUMENTS 4,517,601  5/1985  Yamada et al. ...................... 358/167
4,667,241  5/1987  Saito et al. ........................... 358/167

FOREIGN PATENT DOCUMENTS 58-124378  7/1983  Japan .................................... 358/905
58-124379  7/1983  Japan .................................... 358/905

OTHER PUBLICATIONS

Patent Abstracts of Japan, vol. 9, No. 154 (E-325) (1877) Jun. 28, 1985) Oota.
Patent Abstracts of Japan, vol. 14, No. 67 (E-885) (4010) Feb. 7, 1990 (Yuzawa).
Patent Abstracts of Japan, vol. 14, No. 387 (E-967) (4330) Aug. 21, 1990 (Ito).

*Primary Examiner*—James J. Groody
*Assistant Examiner*—Mark R. Powell
*Attorney, Agent, or Firm*—Lewis H. Eslinger; Jay H. Maioli; Donald S. Dowden

[57] ABSTRACT

A ghost cancelling receiver using ghost cancel reference signal is constructed so that a ghost wave component is adaptively separated from a received video signal on the basis of the level of a noise component thereby to properly cancel the ghost.

5 Claims, 8 Drawing Sheets

| Field Number | 1 | 2 | 3 | 4 | 5 | 6 | 7 | 8 |
|---|---|---|---|---|---|---|---|---|
| Inserted Line | 18 | 281 | 18 | 281 | 18 | 281 | 18 | 281 |
| Signal | WRB | 0 (PDS) | WRB | 0 (PDS) | 0 (PDS) | WRB | 0 (PDS) | WRB |
| (Signal) | $S_1$ | $S_2$ | $S_3$ | $S_4$ | $S_5$ | $S_6$ | $S_7$ | $S_8$ |

FIG. 2A $$S = \frac{1}{4}\{-(S_5 - S_1) + (S_6 - S_2) - (S_7 - S_3) + (S_8 - S_4)\}$$
$$= GCR$$

FIG. 2B $$S = \frac{1}{4}\{-(S_5 - S_1) + (S_6 - S_2) - (S_7 - S_3) + (S_8 - S_4)\}$$
$$= \frac{1}{4}(S_1 - S_2 + S_3 - S_4 - S_5 + S_6 - S_7 + S_8)$$

GHOST CANCELLING RECEIVER USING GHOST CANCEL REFERENCE SIGNAL

BACKGROUND OF THE INVENTION

1. Field of the Invention

The present invention generally relates to a circuit for cancelling a waveform distortion of a video signal and, more particularly, is directed to a ghost cancelling receiver using a ghost cancel reference signal.

2. Description of the Prior Art

In the conventional television receiver, a ghost wave component is cancelled from the received video signal as follows.

That is, a ghost cancel reference signal (hereinafter simply referred to as a GCR signal) is added to the video signal in the transmitting side, while in the receiving side the GCR signal (involving the ghost wave component) of the received video signal and a GCR signal formed at the receiving side are compared with each other in waveform to thereby derive the ghost wave component and also a pass band characteristic of, for example, a transversal filter is controlled so as to cancel the thus produced ghost wave component.

Figure 1A:
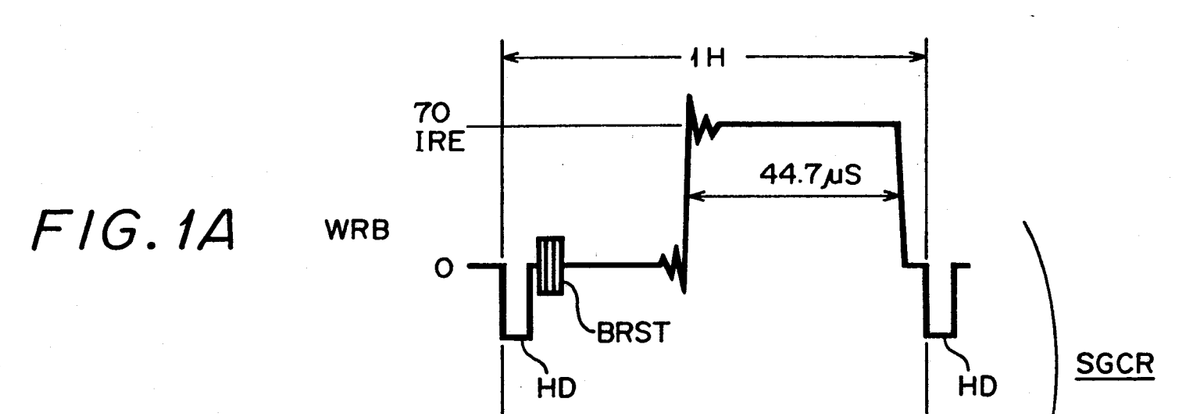
FIGS. 1A through 1C are respectively waveform diagrams of ghost cancel reference (GCR) signals.
Figure 1B:
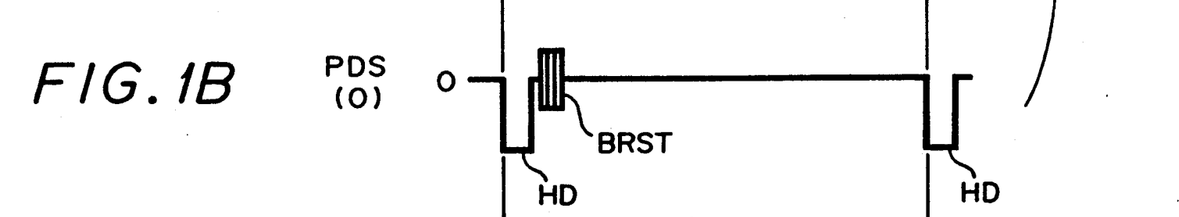
Figure 1C:
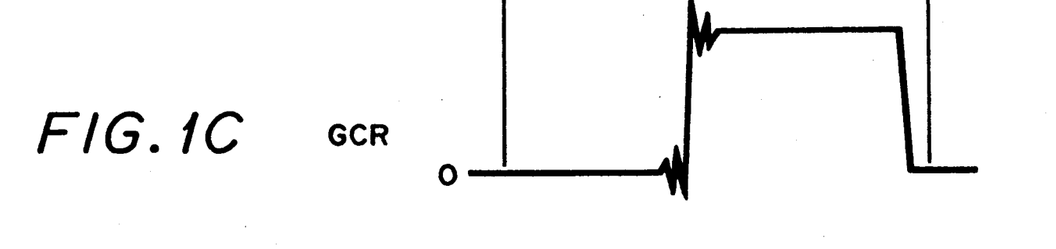

The GCR signal at that time may be a signal SGCR shown in FIGS. 1A through 1C.

Throughout FIGS. 1A to 1C, reference symbol HD represents a horizontal synchronizing (sync.) pulse and BRST a burst signal. As shown in FIG. 1A, a first GCR signal WRB has a bar-shaped waveform located at the rear side of the horizontal period and a width of 44.7 microseconds. The level of the first GCR signal WRB is 70 IRE and the rising characteristic thereof is a ringing characteristic of sin X/X.

Further, a second GCR signal PDS has a pedestal waveform (0 level) as shown in FIG. 1B.

Figure 2A:
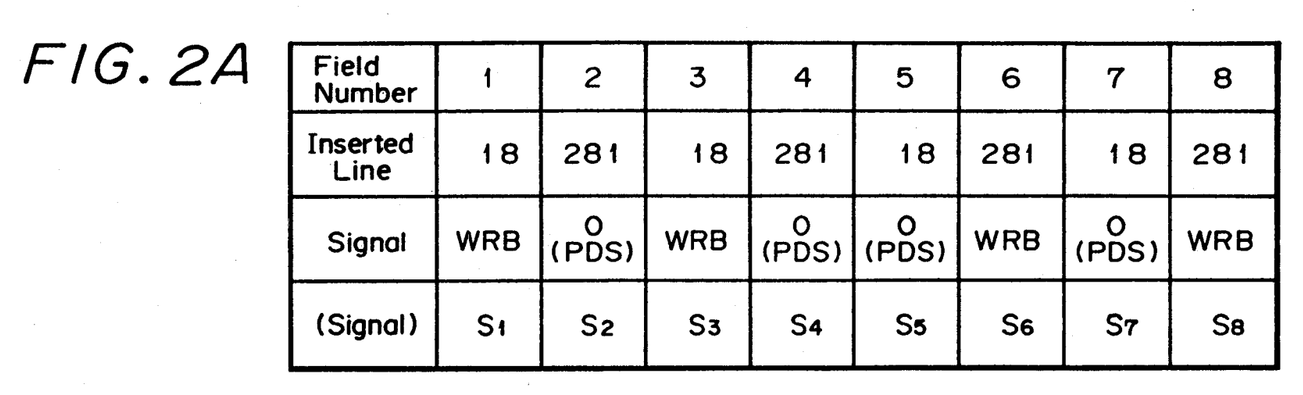
FIGS. 2A, 2B and 2C are a table and examples of equations to which references will be made in explaining how to extract the ghost cancel reference signal from the video signal.

As shown in FIG. 2A, 8 field periods of the video signal are used as the repetitive cycle and the signal WRB is inserted into 18th line or 281th line of the first, third, sixth and eighth field periods. Also, the signal PDS is inserted into 18th line or 281th line of the remaining second, fourth, fifth and seventh field periods and the video signal having the GCR signal inserted thereinto is transmitted.

Figure 2B:
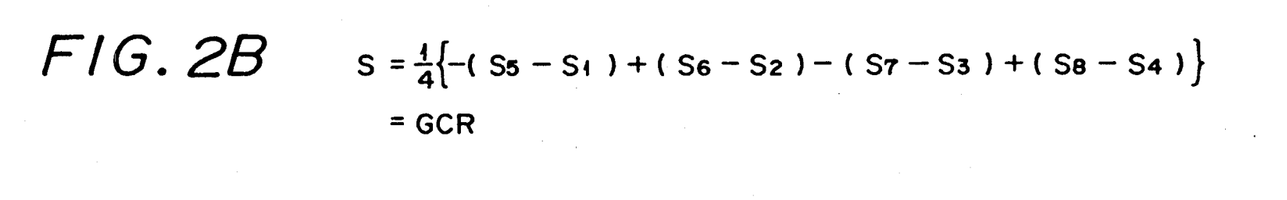

If the calculation shown in FIG. 2B is carried out in the receiving side under the condition such that the first to eighth GCR signals SGCR are taken as $S_1$ to $S_8$, then the calculated result provides a signal GCR shown in FIG. 1C. Further, if the video signal has a ghost, then this signal GCR contains a ghost wave component Sg.

Therefore, the ghost can be cancelled from the signal GCR (and Sg) of the calculated result.

In that case, the burst signal BRST, the color signal and the horizontal synchronizing pulse HD, which are distant by 4 field periods, are the same in phase so that, when the signals $S_1$ to $S_8$ are calculated, the burst signal BRST, the color signal and the horizontal synchronizing pulse HD.

Accordingly, since the signal GCR (and the ghost wave component Sg) of the calculated result does not contain the burst signal BRST, the color signal and the horizontal synchronizing pulse HD, so-called pre-ghost and delay-ghost can be eliminated and the waveform can be equalized in a range of 45 microseconds at maximum. Further, a long ghost of about 80 microseconds can be detected without error.

Furthermore, the GCR signals sequentially transmitted during 8 field periods are employed as one set and one ghost wave component Sg is obtained from the above one set by the calculation shown in FIG. 2B so that, even when the received GCR signal SGCR contains a noise component, such noise component can be suppressed and the S/N ratio can be improved by 3 dB.

Figure 3:
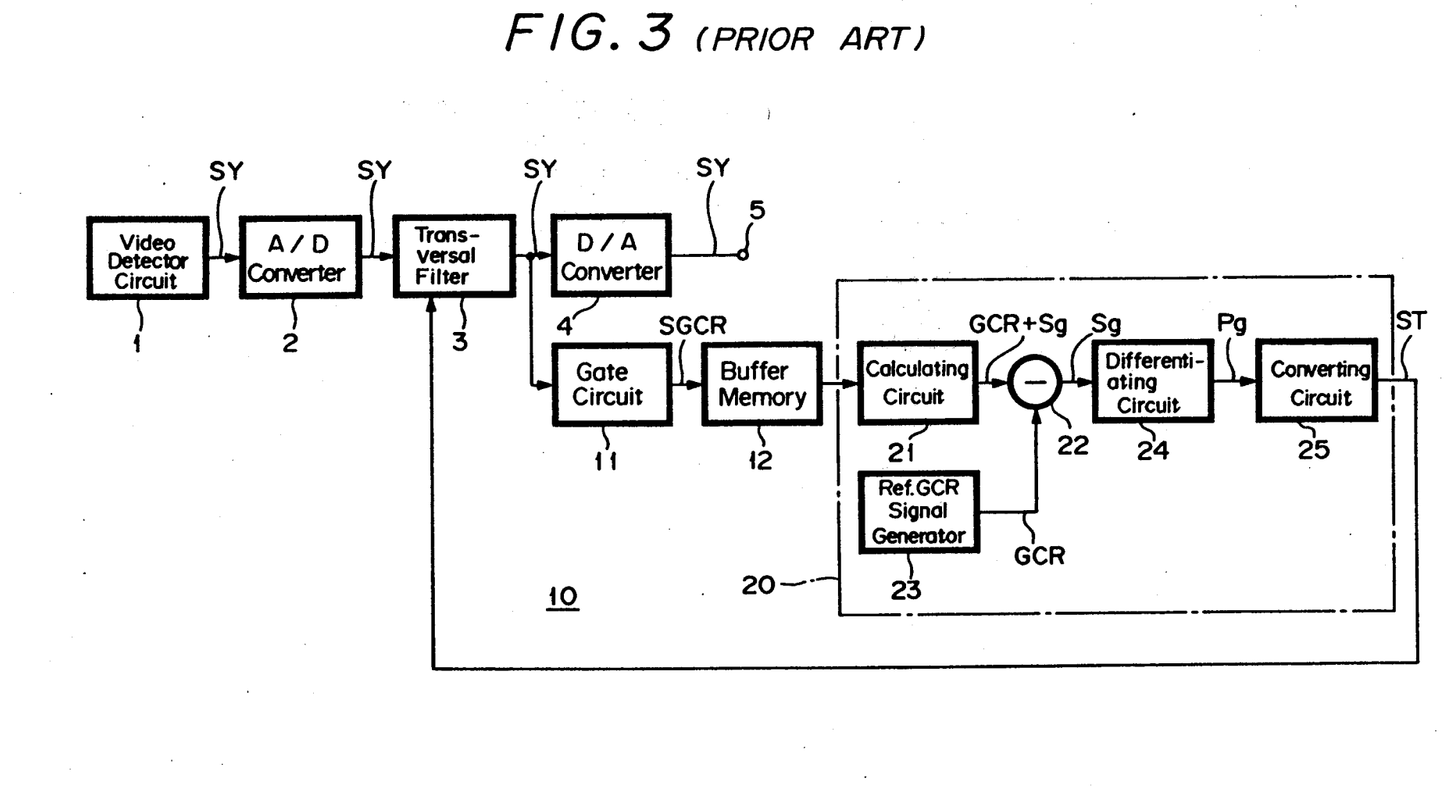
FIG. 3 is a block diagram showing an example of a conventional ghost cancelling receiver using a ghost cancel reference signal.

FIG. 3 shows an example of a conventional ghost cancelling circuit which utilizes the GCR signal.

As shown in FIG. 3, there is provided a video detector circuit 1 for a television receiver. The video detector circuit 1 derives a color composite video signal SY added with the above-mentioned GCR signal SGCR. The color composite video signal SY is supplied to an analog-to-digital (A/D) converter 2, in which it is converted into a digital video signal SY whose one sample is formed of, for example, 8 bits. The digital video signal SY is supplied through a transversal filter 3 having, for example, 640 stages (640 taps) to a digital-to-analog (D/A) converter 4, in which it is converted into the original analog video signal SY. The analog video signal SY is developed at a terminal 5.

In that case, a detection circuit 10 detects a ghost wave component from the GCR signal SGCR and the pass band characteristic of the transversal filter 3 is successively corrected by a detected output of the detection circuit 10, thereby the ghost wave component being eliminated as described above.

Figure 2C:
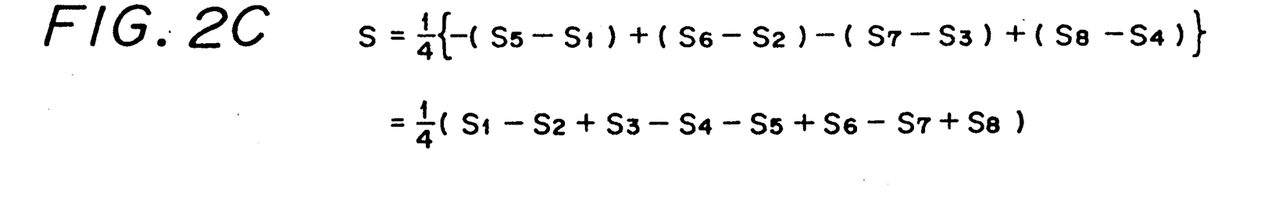

That is, the calculation shown in FIG. 2B can be rewritten as the calculation shown in FIG. 2C, which means that the GCR signals SGCR of respective field periods are sequentially added.

Accordingly, the digitized video signal SY from the transversal filter 3 is supplied to a gate circuit 11 from which there is derived a GCR signal SGCR (including preceding and succeeding detection periods). The thus produced GCR signal SGCR is supplied to a buffer memory 12 which then stores the GCR signal SGCR of the field period at every field period.

The GCR signal SGCR of the buffer memory 12 is supplied to a calculating circuit 21. Although the calculating circuit 21 and the succeeding circuits 22 to 25 are formed of a microcomputer 20 and a software in actual practice, they are represented by the hardware in FIG. 3.

In the calculating circuit 21, the GCR signals SGCR held in the buffer memory 12 are sequentially added or subtracted in accordance with the equation shown in FIG. 2C to thereby produce the signal GCR and the ghost wave component Sg which are the calculated results of the 8 field periods. The signal GCR and the ghost wave component Sg are both supplied to a subtracting circuit 22 and a signal GCR of reference waveform (see FIG. 1C) is generated from a reference GCR signal generator circuit 23. This GCR signal is supplied to the subtracting circuit 22.

Accordingly, the subtracting circuit 22 derives the ghost wave component Sg of the received signal GCR and this ghost wave component Sg is also the error component from which the ghost cannot be eliminated.

Since the signal GCR has the bar-shaped waveform, the signal GCR must be arranged to have a pulse waveform. For this reason, the ghost wave component Sg is supplied to a differentiating circuit 24, in which it is differentiated to provide a differentiated pulse Pg. The differentiated pulse Pg is supplied to a converting circuit 25.

In the converting circuit 25, the differentiated pulse Pg is converted into a signal ST indicative of a correcting amount of a tap coefficient (tap gain) of the transversal filter 3. The signal ST is supplied to the transversal filter 3 to control the pass band characteristic of the transversal filter 3 so that the ghost wave component Sg involved in the GCR signal SGCR is eliminated.

Thereafter, the above-mentioned processing is repeatedly performed so that the pass band characteristic of the transversal filter 3 is adjusted gradually, that is, the pass band characteristic of the transversal filter 3 is successively corrected. Thus, the pass band characteristic of the transversal filter 3 is converged gradually to the characteristic which eliminates the ghost wave component Sg of the GCR signal SGCR.

When the pass band characteristic of the transversal filter 3 is converged sufficiently, then the level of the ghost wave component Sg of the GCR signal SGCR is decreased to a negligible level. At that time, the level of the ghost wave component of the original video signal SY is also decreased to a negligible level. Therefore, the video signal SY from which the ghost wave component is eliminated is developed at the terminal 5 (see "GHOST CANCEL REFERENCE SIGNAL SYSTEM" on Journal of 1989 Nationwide Conference held by The Institute of Television Engineers of Japan).

If the GCR signals SGCR of 8 field periods are added to produce the ghost wave component Sg, then the noise component can be suppressed and the S/N ratio can be improved by 3 dB.

However, it is frequently observed that the noise component cannot be suppressed sufficiently by the above-mentioned processing in the area of weak electric field. If the tap coefficient of the transversal filter 3 is determined under the condition such that the noise component is not suppressed sufficiently, then the noise component and the ghost wave component Sg cannot be discriminated from each other, which causes an error to occur in the detection of the ghost wave component Sg, resulting in the ghost wave component being added to the signal.

In order to solve the above problem, the following proposal is made. That is, the S/N ratio of the received GCR signal SGCR is detected and when the S/N ratio is not satisfactory, the ghost wave component of one field period is calculated not from one set (8 field periods) of the GCR signal SGCR but from a plurality of sets of continuous GCR signals SGCR. According to this proposal, the duration of period in which the GCR signals SGCR are averaged is extended so that the noise component can be eliminated more reliably, thus making it possible to eliminate the ghost wave more reliably.

In accordance with the above proposed method, however, it takes a long period of time to suppress the noise component sufficiently so that the transversal filter needs a lot of time to converge its pass band characteristic, thus decreasing the speed at which the ghost is cancelled.

OBJECTS AND SUMMARY OF THE INVENTION

Accordingly, it is an object of the present invention to provide an improved ghost cancelling receiver using a ghost cancel reference signal in which the aforementioned shortcomings and disadvantages encountered with the prior art can be eliminated.

More specifically, it is an object of the present invention to provide a ghost cancelling receiver using a ghost cancel reference signal in which a ghost can be cancelled stably and properly.

It is another object of the present invention to provide a ghost cancelling receiver using a ghost cancel reference signal in which a ghost can be cancelled at high speed.

It is still another object of the present invention to provide a ghost cancelling receiver using a ghost cancel reference signal in which a ghost can be cancelled more stably and more reliably.

It is a further object of the present invention to provide a ghost cancelling receiver using a ghost cancel reference signal in which a manufacturing cost can be prevented from being increased.

As an aspect of the present invention, a ghost cancelling receiver using a ghost cancel reference signal comprises a transversal filter supplied with a received video signal, a gate circuit connected to the output of the transversal filter for gating a ghost cancel reference (GCR) signal, and a calculating circuit connected to the output of the gate circuit for taking a distortion component from the gated GCR signal.

DETAILED DESCRIPTION OF THE PREFERRED EMBODIMENTS

Before describing the embodiments of the present invention, a fundamental principle of the present invention will be described.

Figure 4A:
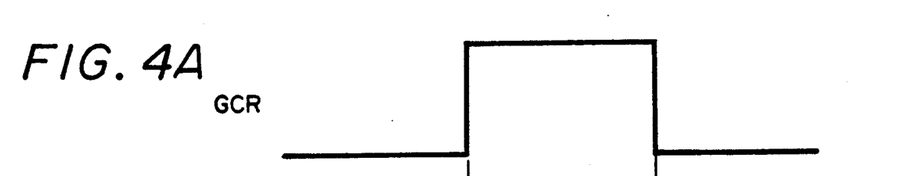
FIGS. 4A through 4G are respectively waveform diagrams of signals used in the present invention.

If the received video signal SY has no ghost component, then the calculating circuit 21 derives a GCR signal GCR having no ghost wave component as shown in FIG. 4A (respective signals are represented in analog form throughout FIGS. 4A to 4G).

Figure 4B:
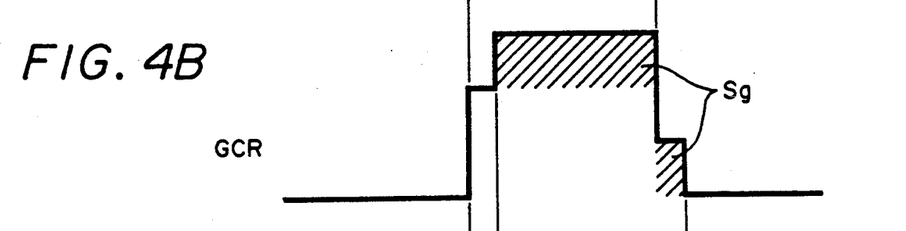
Figure 4C:
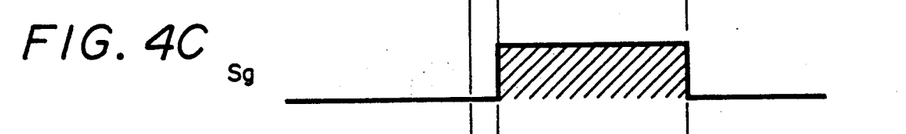
Figure 4D:
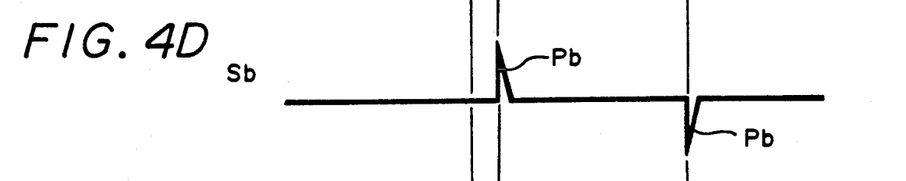

If the received video signal SY has a delay ghost, then the GCR signal GCR from the calculating circuit 21 involves the ghost wave component Sg (shown by a hatched area in FIG. 4B) as shown in FIG. 4B and the subtracting circuit 22 derives the ghost wave component Sg as shown in FIG. 4C. Then, this ghost wave component Sg is supplied to the differentiating circuit 24 so that the differentiating circuit 24 derives a differentiated pulse Pg whose level corresponds to the level of the ghost wave component Sg as shown in FIG. 4D. In the following description, the output signals of the differentiating circuit 24 will be generally referred to as a signal Sb and a pulse Pb represents a differentiated pulse which is associated with the leading edge and the trailing edge of the ghost wave component Sg of the signal Sb.

Figure 4E:
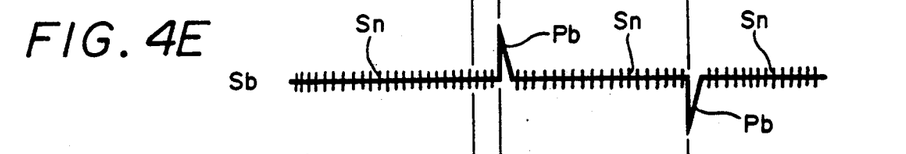

If the received video signal SY or the GCR signal SGCR contains the noise component, then the differentiated signal Sb also contains a noise component Sn as shown in FIG. 4E. If this noise component Sn is large, then an error occurs when the tap coefficient of the transversal filter is calculated as described above.

However, if the noise component Sn occurs due to the weak electric field, then the noise component Sn can be regarded as being distributed with level substantially uniform relative to time during as short period of time as one horizontal period or less.

From the above-mentioned standpoint, the present invention is intended to separate the noise component Sn from the ghost wave component Sg.

Figure 4F:
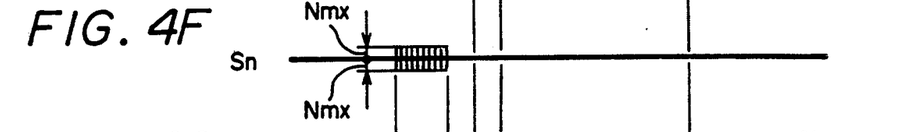

According to the embodiments which will be described later, in the case of the above GCR signal SGCR, the pre-ghost of about 2 microseconds can be eliminated and the ghost wave is hardly produced before the pre-ghost so that, as shown in FIGS. 4E, 4F, a period Tn which is advanced from the leading edge of the GCR signal GCR by 2 microseconds, that is, Tn=3.5 microseconds is employed as the detection period.

Then, as shown in FIG. 4F, the output signal Sb in the detection period Tn is gated to obtain the noise component Sn and a maximum value Nmx of the absolute value of the noise component Sn during this detection period Tn is detected.

Figure 4G:
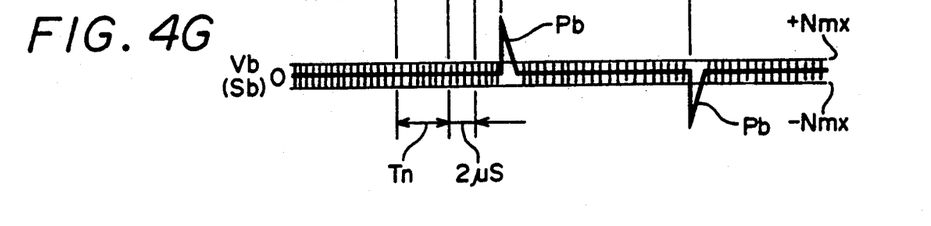

As shown in FIG. 4G, an absolute value Vb of the differentiated signal Sb of the ghost cancelling period (ghost detection period) following the detection period Tn and the maximum value Nmx are compared with each other during this ghost cancelling period.

In the case of the differentiated pulse Pg of the ghost wave component Sg, an inequality of Vb>Nmx is satisfied so that the signal Sb at that time can be regarded as the pulse Pg.

Accordingly, the signal Sb at that time is detected as the pulse Pg to thereby determine the tap coefficient of the transversal filter.

Figure 5A:
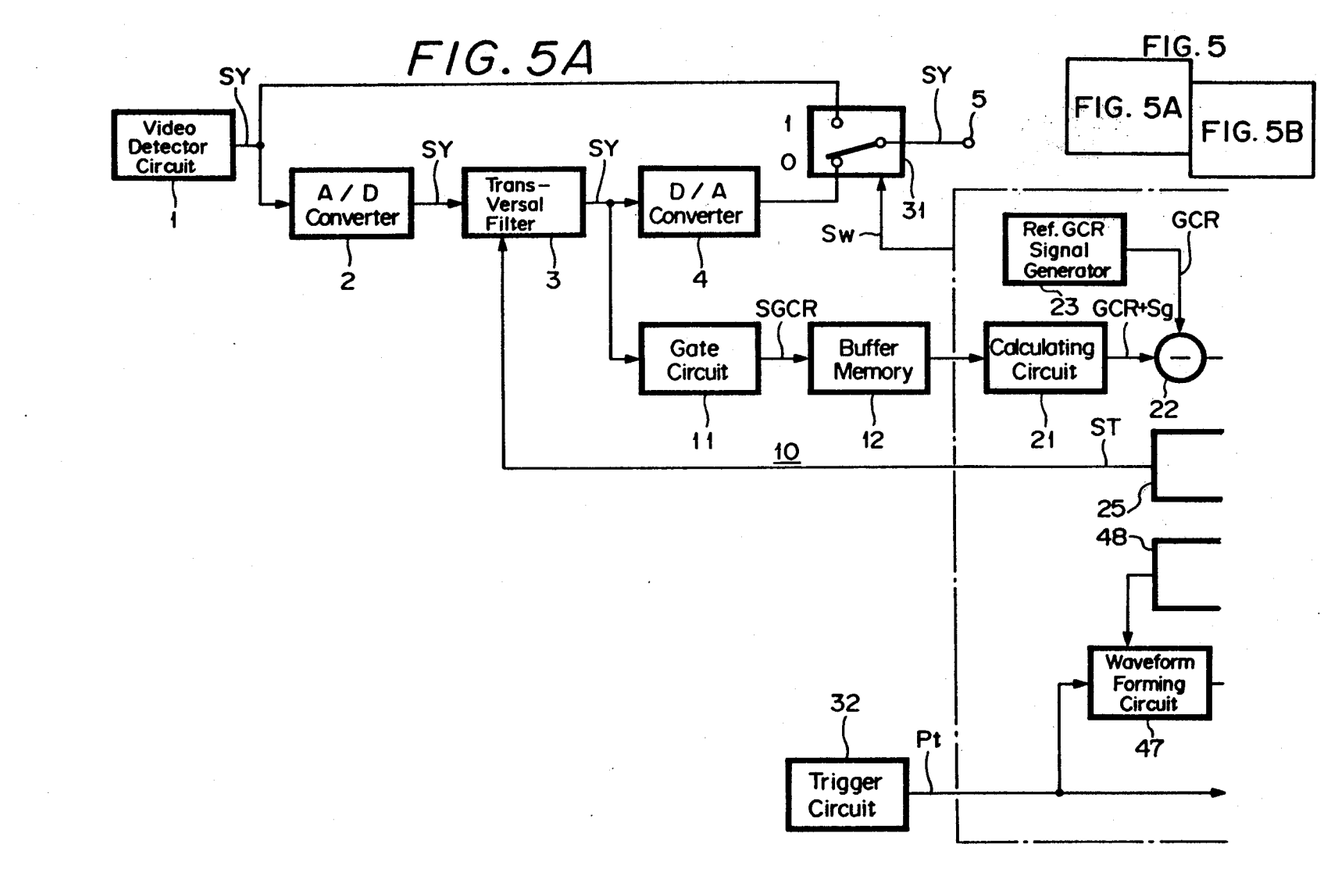
FIG. 5 (formed of FIGS. 5A and 5B) is a block diagram showing a first embodiment of a ghost cancelling receiver using a ghost cancel reference signal according to the present invention.
Figure 5B:
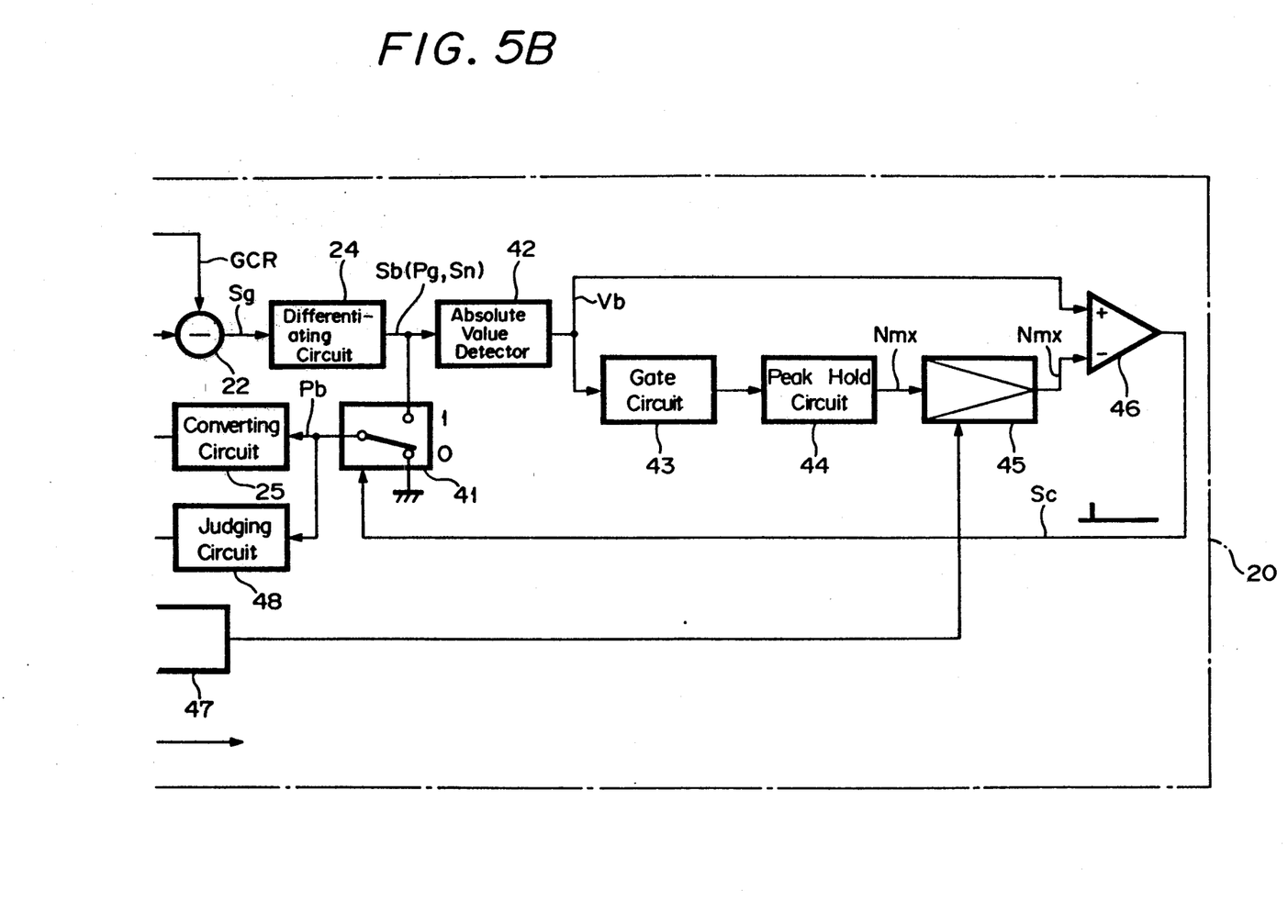

Referring to the drawings in detail and initially to FIG. 5, a first embodiment of the ghost cancelling receiver using a ghost cancel reference signal according to the present invention will be described. FIG. 5 is formed of FIGS. 5A and 5B drawn on two sheets of drawings so as to permit the use of a suitably large scale. Also, in FIG. 5, like parts corresponding to those of FIG. 3 are marked with the same references and therefore need not be described in detail.

Referring to FIG. 5, the video signal SY from the D/A converter 4 is supplied to a switching circuit 31 and the video signal SY from the video detector circuit 1 is also supplied to the switching circuit 31. A control signal Sw from the microcomputer 20 is supplied to the switching circuit 31 whose output signal is developed at the terminal 5.

A switching circuit 41 is adapted to separate the original differentiated pulse Pg from the output signal Sb of the differentiating circuit 24. An absolute value detecting circuit 42 is formed of, for example, a full-wave rectifying circuit to derive the absolute value Vb of the output signal Sb of the differentiating circuit 24.

A gate circuit 43 derives the absolute value Vb of the signal Sb in the period Tn and a peak hold circuit 44 holds the maximum value Nmx of the thus produced absolute value Vb. A level comparator circuit 46 is adapted to level-compare the absolute value Vb of the signal Sb and the maximum value Nmx with each other.

Further, a waveform forming circuit 47 and a judging circuit 48 are adapted to increase ghost detection accuracy or ghost cancelling speed by changing the maximum value Nmx with time.

Although the above-mentioned circuits 41 to 48 are formed of the microcomputer 20 and the software similarly to the circuits 21 to 25, they are represented by the hardware in this embodiment.

A trigger circuit 32 derives a trigger pulse Pt when the channel is switched, the power switch is turned on or when the user operates the ghost cancel key, etc. The trigger pulse Pt is supplied to the microcomputer 20 as a tap coefficient setting starting signal for the transversal filter 3.

According to the above-mentioned circuit arrangement, in the stationary state, the control signal Sw is at low "0" level so that the switching circuit 31 is connected to the D/A converter 4 side as shown in FIG. 5. Accordingly, in the stationary state, the ghost cancelling circuit of FIG. 5 has an equivalent configuration to that of FIG. 3 and therefore a similar ghost cancelling operation is performed.

However, if the channel is switched, the power switch is turned on or if the ghost cancel key is operated at an arbitrary time point, then the trigger pulse Pt is supplied from the trigger circuit 32 to the microcomputer 20. Then, on the basis of the trigger pulse Pt, the microcomputer 20 causes the control signal Sw to go high "1" level so that the switching circuit 31 is connected in the opposite state to thereby supply the video signal SY from the video detector circuit 1 to the terminal 5.

During the period Tn, the absolute value Vb of the signal Sb from the absolute value detecting circuit 42 is supplied through the gate circuit 43 to the peak hold circuit 43 which then holds the maximum value Nmx of the absolute value Vb of the signal Sb in the period Tn.

Then, the thus held maximum value Nmx is supplied through a variable gain amplifier 45, which will be described later, to the level comparator circuit 46 and the absolute value Vb of the signal Sb from the absolute value detector circuit 42 is supplied to the level comparator circuit 46 so that the level comparator circuit 46 derives a compared output signal Sc which goes high "1" level when the inequality of Vb>Nmx is satisfied. Incidentally, the compared output signal Sc goes high "1" level when the original differentiated pulse Pb is obtained.

The compared output signal Sc is supplied to the switching circuit 41 as a control signal, whereby 0 level is supplied to the converting circuit 25 if Sc="0". If on the other hand Sc="1", then the output signal Sb of the differentiating circuit 24 is supplied to the converting circuit 25. 2 Thus, only when the inequality of Vb>Nmx is satisfied, the output signal Sb of the differentiating circuit 24 is supplied to the converting circuit 25, while when Vb≦Nmx is satisfied, then the signal Sb is regarded as a noise component and 0 level is supplied to the converting circuit 25. That is, of the signals Sb from the differentiating circuit 24, only the original differentiated pulse Pb is supplied to the converting circuit 25 and the noise component Sn is not supplied to the converting circuit 25 substantially.

Then, the converting circuit 25 calculates the tap coefficient of the transversal filter 3 by utilizing the differentiated pulse Pb which does not contain the noise component Sn substantially. Accordingly, the pass band characteristic of the transversal filter 3 is successively corrected and gradually converged to the characteristic such that the ghost wave component Sg of the GCR signal SGCR is cancelled.

When the characteristic of the transversal filter 3 is converged, the level of the ghost wave component Sg is large at the starting time point of the convergence and the level of the ghost wave component Sg is decreased as the characteristic of the transversal filter 3 is converged so that the level of the differentiated pulse Pb contained in the output signal Sb of the differentiating circuit 24 is changed similarly. On the other hand, the level of the noise component Sn involved in the output signal Sb is considered to be substantially constant.

Therefore, in this embodiment, the amplifier 45 controls the level at which the absolute value Vb and the maximum value Nmx are compared with each other.

Figure 6A:
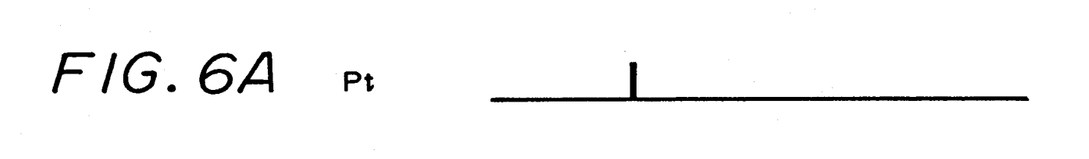
FIGS. 6A and 6B are respectively schematic diagrams showing characteristics of pulse and gain of the present invention.
Figure 6B:
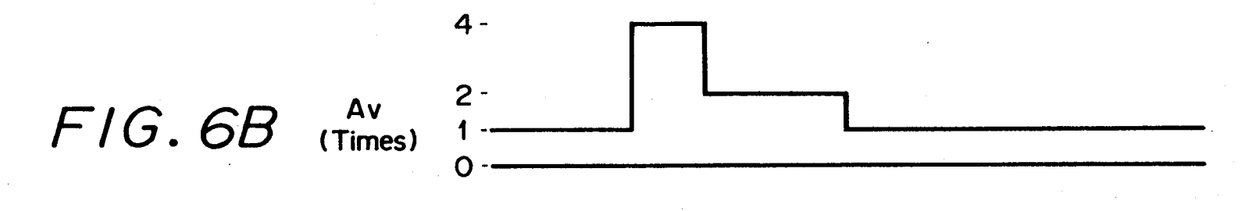

More specifically, the pulse Pt from the trigger circuit 32 is supplied to the waveform forming circuit 47 which then derives a control signal of a predetermined waveform. This control signal is supplied to the amplifier 45 as a gain control signal so that the gain Av of the amplifier 45 is controlled so as to satisfy $Av=1$ time till the time point of the pulse Pt, $Av=4$ times from the time point of the pulse Pt, $Av=2$ times from the time point in which the tap coefficient of the transversal filter 3 is determined about 10 times and $Av=1$ time from the time point after the tap coefficient of the transversal filter 3 is determined about 30 times.

Accordingly, the magnitude of the maximum value Nmx of the period Tn supplied to the level comparator circuit 46 in actual practice is changed in response to the change of the gain Av of the amplifier 45, that is, in response to the level of the differentiated pulse Pb, whereby the level comparator circuit 46 can be operated reliably, thus the ghost detection accuracy or the ghost cancelling speed being increased.

When the pass band characteristic of the transversal filter 3 is converged, the pulse Pb from the switching circuit 41 is supplied to a judging circuit 48 which then determines whether or not the level of the pulse Pb becomes lower than the detection level of the ghost wave signal. If it is determined that the level of the pulse Pb becomes lower than the detection level, then the waveform generating circuit 47 is controlled by the judged output of the judging circuit 48 so as to satisfy $Av=1$ time regardless of the present gain Av of the amplifier 45.

Therefore, the noise component Sn will hereinafter be cancelled on the basis of the level of the original noise component Sn.

As described above, according to this invention, the ghost wave component is cancelled. Particularly, in accordance with the present invention, the maximum value Nmx of the noise component Sn during the non-ghost detection period Tn is detected so that, only when the level of the ghost wave component Sg (differentiated pulse Pb) exceeds the maximum value Nmx, the ghost wave component Sg is regarded as being effective during the ghost detection period and the ghost wave component Sg is adaptively separated, thus making it possible to stably and properly cancel the ghost.

Further, when the ghost wave component Sg for one field period is obtained, such ghost wave component Sg can be obtained from a set of the GCR signals SGCR so that the pass band characteristic of the transversal filter 3 is converged without delay, thereby the ghost being cancelled at high speed.

Furthermore, since the threshold level at which the differentiated pulse Pb of the output signal Sb is regarded as being effective is changed while the pass band characteristic of the transversal filter 3 is converged, the effective differentiated pulse Pb can be obtained more reliably, thus making it possible to cancel the ghost more stably and more reliably.

In addition, in order to effect the above operation in which the effective differentiated pulse Pb is obtained more stably and more reliably, only the software of the microcomputer 20 must be varied, which can prevent the manufacturing cost of the ghost cancelling receiver of the present invention from being increased.

Figure 7:
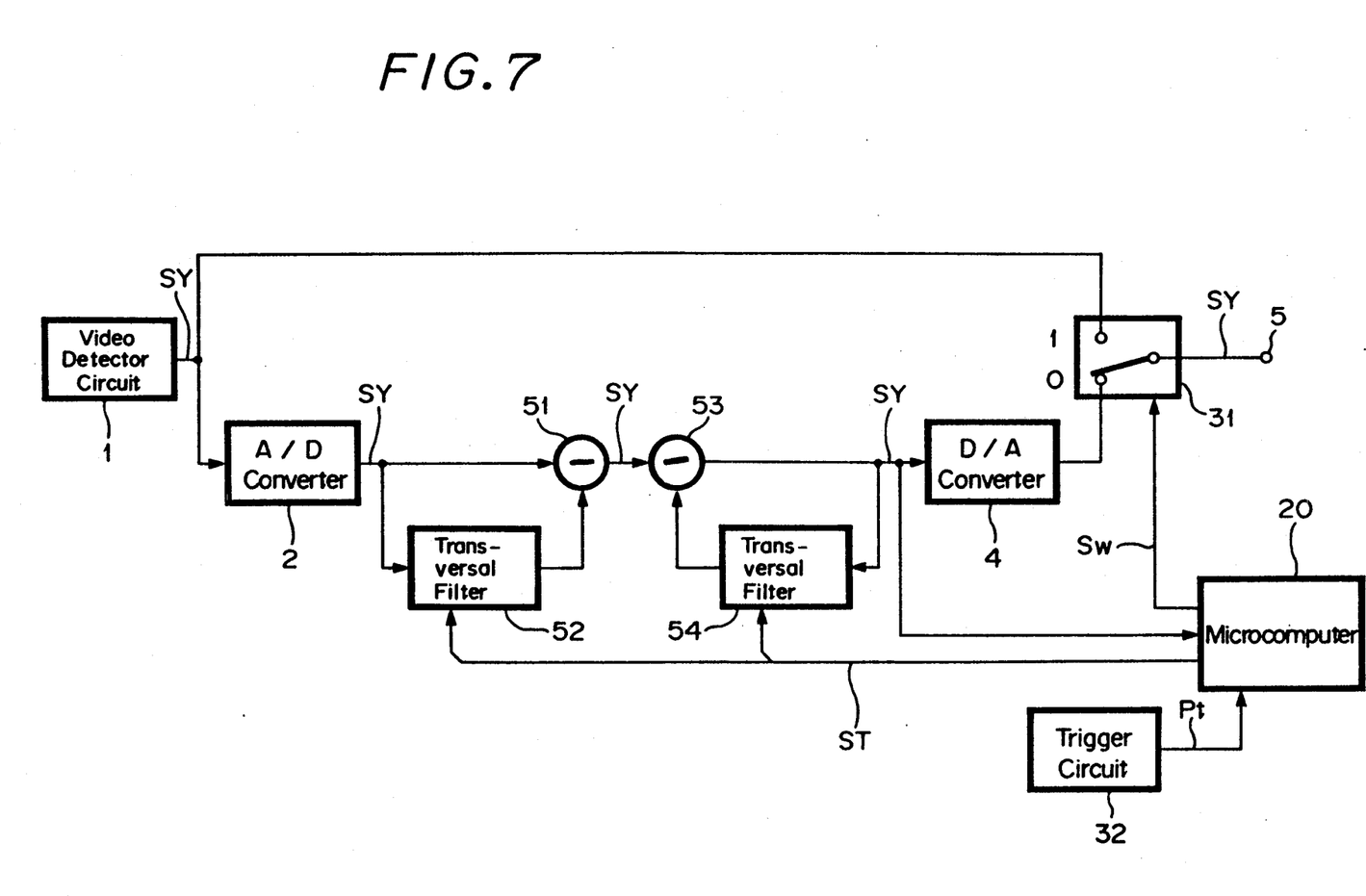
FIG. 7 is a block diagram showing a second embodiment of the ghost cancelling receiver using a ghost cancel reference signal according to the present invention.

FIG. 7 shows in block form an arrangement of a second embodiment of the present invention, and to which references will be made in explaining another example of the connected state of the transversal filter 3. In FIG. 7, like parts corresponding to those of FIG. 5 are marked with the same references and therefore need not be described in detail.

As shown in FIG. 7, the video signal SY from the A/D converter 2 is supplied to a first subtracting circuit 51 and is also supplied through a first transversal filter 52 to the first subtracting circuit 51.

An output signal from the first subtracting circuit 51 is supplied to a second subtracting circuit 53 and an output of the second subtracting circuit 53 is supplied through a second transversal filter 54 to the second subtracting circuit 53. An output signal from the second subtracting circuit 53 is supplied to the D/A converter 4.

The signal ST from the detecting circuit 10 (not shown) is supplied to the first and second transversal filters 52 and 54 as a pass band characteristic control signal.

Since the first subtracting circuit 51 and the first transversal filter 52 are constructed as a feedfoward-type loop, the subtracting circuit 51 derives the video signal SY from which the near-by ghost wave component involving the pre-ghost is cancelled.

Further, since the second subtracting circuit 53 and the second transversal filter 54 are constructed as a feedback-type loop, the subtracting circuit 53 derives the video signal SY from which a long ghost wave component is cancelled.

Therefore, the video signal SY from which the near-by ghost wave component and the long ghost wave component are cancelled is developed at the terminal 5.

While the differentiated signal Sb is obtained after the reference GCR signal GCR is subtracted from the GCR signal GCR and the ghost wave component Sg as described above, such a variant is also possible that a signal, which results from differentiating the reference GCR signal GCR, is subtracted from the GCR signal and a signal, which results from differentiating the ghost wave component Sg, to thereby obtain the differentiated signal Sb of the ghost wave component Sg.

According to the present invention, the maximum value Nmx of the noise component Sn during the non-ghost detection period Tn is detected so that, only when the level of the ghost wave component Sg (differentiated pulse Pb) exceeds the maximum value Nmx, the ghost wave component Sg is regarded as being effective during the ghost detection period and the ghost wave component Sg is adaptively separated, thus making it possible to stably and properly cancel the ghost.

Furthermore, when the ghost wave component Sg for one field period is obtained, such ghost wave component Sg can be obtained from a set of the GCR signals SGCR so that the pass band characteristic of the transversal filter 3 is converged without delay, thereby the ghost being cancelled at high speed.

In addition, in order to cancel the ghost at high speed, only the software of the microcomputer 20 must be varied, which can prevent the manufacturing cost of the ghost cancelling receiver of the present invention from being increased.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A ghost cancelling receiver using a ghost cancel reference signal and comprising:
   a transversal filter supplied with a received video signal;
   a gate circuit connected to the output of said transversal filter for gating a ghost cancel reference signal;
   a calculating circuit connected to the output of said gate circuit deriving a distortion component from said gated ghost cancel reference signal, said distortion component being utilizable for cancelling a ghost signal from said received video signal;
   a maximum value detection circuit connected to the output of said calculating circuit;
   a comparator for comparing the output of said maximum value detection circuit and a signal which is derived from said calculating circuit but has not gone through said maximum value detection; and
   a feedback loop starting from the output of said comparator and extending to a control terminal of said transversal filter for controlling a characteristic of a pass band of said transversal filter.

2. A ghost cancelling receiver as claimed in claim 1 further comprising:
   a ghost cancel reference signal generator; and
   subtracting means for subtracting the output of said ghost cancel reference signal generator from the output of said calculating circuit.

3. A ghost cancelling receiver as claimed in claims 1 further comprising:
   a differentiating circuit connected to the output of said subtracting means; and
   absolute value detecting means connected to the output of said differentiating circuit.

4. A ghost cancelling receiver as claimed in claim 3 further comprising:
   feedback switching means connected to the output of said differentiating circuit and controlled by the output signal of said comparator; and
   converting means connected to the output signal of said feedback switching means for converting the output of said differentiating circuit into a control signal of said transversal filter.

5. A ghost cancelling receiver as claimed in claim 1, further comprising:
   an output switch connected to the output of said transversal filter; and
   microcomputer means including said calculation circuit for controlling said output switch; and wherein said transversal filter comprises a first unit which comprises filter means and a subtracter connected as a feedforward loop, and a second unit which comprises filter means and a subtracter connected as a second feedback loop.

* * * * *